United States Patent
Eromäki et al.

(10) Patent No.: US 11,523,034 B2
(45) Date of Patent: Dec. 6, 2022

(54) IMAGING APPARATUS

(71) Applicant: Microsoft Technology Licensing, LLC, Redmond, WA (US)

(72) Inventors: Marko Eromäki, Tampere (FI); Mikko Juhola, Muurla (FI); Eero Salmelin, Tampere (FI)

(73) Assignee: Microsoft Technology Licensing, LLC, Redmond, WA (US)

( * ) Notice: Subject to any disclaimer, the term of this patent is extended or adjusted under 35 U.S.C. 154(b) by 93 days.

(21) Appl. No.: 15/041,015

(22) Filed: Feb. 10, 2016

(65) Prior Publication Data
US 2017/0230552 A1     Aug. 10, 2017

(51) Int. Cl.
*H04N 5/225*     (2006.01)
*G02B 27/64*     (2006.01)
(Continued)

(52) U.S. Cl.
CPC ............. *H04N 5/2254* (2013.01); *G02B 7/04* (2013.01); *G02B 7/09* (2013.01); *G02B 13/001* (2013.01);
(Continued)

(58) Field of Classification Search
CPC .. H04N 5/2257; H04N 5/2254; H04N 5/2252; H04N 5/2253; H04N 5/23287; G02B 13/001–009; G02B 7/04–105; G02B 7/09; G02B 27/646; H04M 1/0264; H01L 27/14618; G03B 17/04; G03B 5/00;
(Continued)

(56) References Cited

U.S. PATENT DOCUMENTS 4,318,593 A    3/1982   Tsuji et al.
5,557,152 A    9/1996   Gauthier
(Continued)

FOREIGN PATENT DOCUMENTS

CN     1106927 A     8/1995
CN     1862358 A     11/2006
(Continued)

OTHER PUBLICATIONS

H., Victor, "First Image from Sony's Curved, Eye-Mimicking Camera Sensor Surfaces", Published on: Jul. 8, 2014, 4 pages, Available at: http://www.phonearena.com/news/First-image-from-Sonys-curved-eye-mimicking-camera-sensor-surfaces_id57941.
(Continued)

*Primary Examiner* — Padma Haliyur
*Assistant Examiner* — Selam T Gebriel

(57) ABSTRACT

The imaging apparatus comprises a retractable structure with active and inactive positions. An outermost lens group and a lens group actuator are movable along an optical axis. In the inactive position the lens group and the lens group actuator reside close to an image sensor. The lens group actuator is positioned to the same level as the image sensor. In the active position the outermost lens group and the lens group actuator are further from the image sensor along the optical axis. The retractable structure may protrude from the device, covering the imaging apparatus. In one example the structure is reversed, the image sensor protrudes from the device while the outermost lens group is fixed to the device body.

20 Claims, 7 Drawing Sheets

(51) Int. Cl.

| | | |
|---|---|---|
| *G02B 13/00* | (2006.01) | |
| *G02B 7/04* | (2021.01) | |
| *G03B 17/04* | (2021.01) | |
| *G03B 5/00* | (2021.01) | |
| *G02B 7/09* | (2021.01) | |
| *G03B 5/06* | (2021.01) | |
| *G03B 13/36* | (2021.01) | |
| *H02K 41/035* | (2006.01) | |
| *H02N 2/02* | (2006.01) | |
| *H04N 5/232* | (2006.01) | |
| *H04M 1/02* | (2006.01) | |

(52) U.S. Cl.
CPC ............. *G02B 27/646* (2013.01); *G03B 5/00* (2013.01); *G03B 5/06* (2013.01); *G03B 13/36* (2013.01); *G03B 17/04* (2013.01); *H02K 41/0354* (2013.01); *H02N 2/02* (2013.01); *H04N 5/2252* (2013.01); *H04N 5/2253* (2013.01); *H04N 5/23287* (2013.01); *G03B 2205/0023* (2013.01); *H04M 1/0264* (2013.01)

(58) Field of Classification Search
CPC .. G03B 5/06; G03B 13/36; G03B 2205/0023; H02K 41/0354; H02N 2/02
See application file for complete search history.

(56) References Cited

U.S. PATENT DOCUMENTS

| | | | |
|---|---|---|---|
| 6,255,749 B1 | 7/2001 | Aoshima et al. | |
| 7,424,214 B2 | 9/2008 | Kim et al. | |
| 7,443,439 B2 | 10/2008 | Kim et al. | |
| 7,443,446 B2 | 10/2008 | Seo | |
| 7,477,315 B2 | 1/2009 | Shin | |
| 7,747,162 B2 | 6/2010 | Kim | |
| 7,777,952 B2 | 8/2010 | Homme | |
| 7,795,577 B2 | 9/2010 | Olsen et al. | |
| 8,131,147 B2 | 3/2012 | Kusatsugu | |
| 8,363,150 B2* | 1/2013 | Ming | G03B 3/00 348/340 |
| 8,730,595 B2 | 5/2014 | Shikama et al. | |
| 8,814,447 B1* | 8/2014 | Hambergen | G03B 17/04 396/348 |
| 8,848,064 B2 | 9/2014 | Topliss et al. | |
| 8,896,711 B2 | 11/2014 | Akutsu et al. | |
| 9,134,587 B2 | 9/2015 | Lim et al. | |
| 9,235,023 B2 | 1/2016 | Burt et al. | |
| 2002/0101665 A1 | 8/2002 | Ohashi et al. | |
| 2002/0154243 A1 | 10/2002 | Fife et al. | |
| 2004/0095499 A1* | 5/2004 | Ning | H04N 5/2254 348/335 |
| 2006/0082659 A1 | 4/2006 | Koo | |
| 2006/0125950 A1 | 6/2006 | Chen | |
| 2006/0153559 A1 | 7/2006 | Kim | |
| 2006/0170814 A1 | 8/2006 | Tsai | |
| 2007/0211164 A1 | 9/2007 | Olsen et al. | |
| 2009/0252488 A1 | 10/2009 | Eromaki et al. | |
| 2009/0279190 A1 | 11/2009 | Chou | |
| 2011/0045877 A1 | 2/2011 | Ahn et al. | |
| 2012/0014002 A1 | 1/2012 | Ollila et al. | |
| 2012/0063761 A1 | 3/2012 | Tang et al. | |
| 2012/0070138 A1* | 3/2012 | Onishi | G03B 17/02 359/557 |
| 2013/0003196 A1* | 1/2013 | Guenter | G02B 13/0035 359/784 |
| 2013/0194490 A1 | 8/2013 | Okuyama et al. | |
| 2013/0265649 A1 | 10/2013 | Ohashi | |
| 2013/0293762 A1 | 11/2013 | Lipson et al. | |
| 2014/0009631 A1* | 1/2014 | Topliss | H04N 5/2254 348/208.11 |
| 2014/0049683 A1 | 2/2014 | Guenter et al. | |
| 2014/0146223 A1* | 5/2014 | Eromaki | G02B 7/08 348/357 |
| 2014/0294372 A1 | 10/2014 | Shintani | |
| 2014/0313602 A1 | 10/2014 | Kudoh | |
| 2014/0340537 A1* | 11/2014 | Eromaki | G03B 5/06 348/208.8 |
| 2014/0354814 A1 | 12/2014 | Han et al. | |
| 2014/0376113 A1 | 12/2014 | Guenter et al. | |
| 2015/0049209 A1 | 2/2015 | Hwang et al. | |
| 2015/0085363 A1 | 3/2015 | Liu et al. | |
| 2015/0138639 A1* | 5/2015 | Lim | G02B 7/022 359/557 |
| 2015/0365568 A1* | 12/2015 | Topliss | G02B 7/08 348/360 |
| 2016/0216527 A1 | 7/2016 | Juhola et al. | |
| 2016/0377947 A1* | 12/2016 | Scepanovic | G02F 1/157 455/566 |
| 2017/0108705 A1* | 4/2017 | Yu | G02B 13/009 |
| 2017/0227731 A1 | 8/2017 | Eromaki | |
| 2018/0052385 A1 | 2/2018 | Juhola et al. | |

FOREIGN PATENT DOCUMENTS

| | | |
|---|---|---|
| CN | 2899315 Y | 5/2007 |
| CN | 2909319 Y | 6/2007 |
| CN | 101681011 A | 3/2010 |
| CN | 201821392 U | 5/2011 |
| CN | 102123185 A | 7/2011 |
| CN | 102640029 A | 8/2012 |
| CN | 103338622 A | 10/2013 |
| CN | 104111512 A | 10/2014 |
| CN | 104204887 A | 12/2014 |
| CN | 204069138 U | 12/2014 |
| CN | 104423118 A | 3/2015 |
| CN | 204422877 U | 6/2015 |
| CN | 105446053 A | 3/2016 |
| CN | 108432215 A | 8/2018 |
| EP | 1734744 A2 | 12/2006 |
| EP | 1884828 A1 | 2/2008 |
| JP | 2008065221 A | 3/2008 |
| KR | 20050014496 A | 2/2005 |
| KR | 100620697 B1 | 9/2006 |
| KR | 20150112207 A | 10/2015 |
| WO | 2010108041 A1 | 9/2010 |
| WO | 2017139173 A2 | 8/2017 |
| WO | 2017139174 A1 | 8/2017 |

OTHER PUBLICATIONS

Kim, et al., "A Mobile Auto-Focus Actuator based on a Rotary VCM with the Zero Holding Current", In Journal of Optics Express, vol. 17, Issue 7, Mar. 27, 2009, pp. 5891-5896.

"Samsung Galaxy K Zoom", Retrieved on: Nov. 25, 2015, 12 pages, Available at: http://www.samsung.com/uk/consumer/mobile-devices/smartphones/others/SM-C1150ZKABTU.

Waller, Joshua, "Panasonic Lumix DMC-CM1 Camera Phone Review", Published on: Jan. 14, 2015, 14 pages, Available at: https://www.ephotozine.com/article/panasonic-lumix-dmc-cm1-camera-phone-review-26772.

"Samsung Starts Selling World's First 10 Megapixel Camera Phone", Published on: Oct. 10, 2006, 2 pages, Available at: http://phys.org/news/2006-10-samsung-world-megapixel-camera.html.

"International Search Report and Written Opinion Issued in PCT Application No. PCT/US2017/016311", dated Aug. 3, 2017, 23 Pages.

"Non Final Office Action Issued in U.S. Appl. No. 15/238,705", dated Jan. 16, 2018, 17 Pages.

Alexander, Wong, "A New Honor Smart Phone Appears with a Pop up Camera Module", Retrieved From: https://www.soyacincau.com/2015/08/04/a-new-honor-smart-phone-appears-with-a-pop-up-camera-module/, Aug. 4, 2015, 3 Pages.

"International Search Report and Written Opinion Issued in PCT Application No. PCT/US2017/016310", dated Aug. 16, 2017, 23 Pages.

"International Search Report and Written Opinion Issued in PCT Application No. PCT/US2017/045998", dated Oct. 10, 2017, 13 Pages.

(56) References Cited

OTHER PUBLICATIONS

Song, et al., "Development of Small Sized Actuator with Compliant Mechanism for Optical Image Stabilization", In Proceedings of IEEE Transactions on Magnetics, vol. 46, Issue: 6, Jun. 2010, 4 Pages.
"Non Final Office Action Issued in U.S. Appl. No. 15/041,011", dated Mar. 15, 2019, 18 Pages.
"Final Office Action Issued in U.S. Appl. No. 15/041,011", dated Aug. 28, 2019, 14 Pages.
"Second Office Action and Search Report Issued in Chinese Patent Application No. 201780050500.8", dated Sep. 24, 2020, 20 Pages.
"Second Office Action and Search Report issued in Chinese Patent Application No. 201780004711.8", dated May 18, 2020, 21 Pages.
"First Office Action and Search Report issued in Chinese Patent Application No. 201780050500.8", dated May 6, 2020, 23 Pages.
"Third Office Action Issued in Chinese Patent Application No. 201780050500.8", dated Dec. 9, 2020, 14 Pages.
"Office Action Issued in European Patent Application No. 17757609.7", dated Feb. 6, 2020, 4 Pages.
"Non Final Office Action Issued in U.S. Appl. No. 15/041,011", dated Mar. 18, 2020, 26 Pages.
"Third Office Action Issued in Chinese Patent Application No. 201780004711.8", dated Oct. 20, 2020, 16 Pages.
"Office Action Issued in European Patent Application No. 17757609.7", dated Jul. 9, 2020, 4 Pages.
"Office Action Issued in European Patent Application No. 17757609.7, dated Feb. 3, 2021", 4 Pages
"Office Action Issued in Chinese Patent Application No. 201780004711.8", dated Apr. 2, 2021, 11 Pages.
"Office Action Issued in European Patent Application No. 17757609.7", dated Sep. 9, 2021, 4 Pages.
"First Office Action and Search Report Issued in Chinese Patent Application No. 201780004711.8", dated Oct. 25, 2019, 20 Pages.
"Office Action Issued in Chinese Patent Application No. 201780004711.8", dated Mar. 31, 2022, 20 Pages.
"Notice of Allowance Issued in European Patent Application No. 17757609.7", dated Aug. 23, 2022, 7 Pages.

\* cited by examiner

IMAGING APPARATUS

BACKGROUND

Digital cameras usually comprise a lens and a sensor for capturing an image by capturing light and converting it into electrical signals. Mobile electronic devices such as smart phones are usually equipped with an imaging apparatus, for example, a camera. The imaging quality of the mobile electronic devices may be improved by optical image stabilization or autofocus. A current trend in designing mobile electronic devices aims for thin devices, wherein the form factor benefits from thin imaging apparatus to be housed inside the mobile electronic device.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

The imaging apparatus comprises a retractable structure with active and inactive positions. An outermost lens group and a lens group actuator are movable along an optical axis. Examples of a lens group actuator are an autofocus actuator or an optical image stabilizer. In the inactive position the lens group and the lens group actuator reside close to an image sensor. The lens group actuator is positioned at the same level as the image sensor. In one example the actuator has a circular shape and the image sensor fits inside the actuator perimeter.

In the active position the outermost lens group and the lens group actuator are further from the image sensor along the optical axis. The retractable structure may protrude from the device housing the imaging apparatus. In one example the outermost lens group and the lens group actuator protrude from the device. In one example the structure is reversed, the image sensor protrudes from the device while the outermost lens group is fixed to the device body. The structure allows imaging apparatuses with better optical characteristics to be implemented for example in very thin devices. Devices with various form factors may benefit from smaller imaging apparatus as there is more room to implement other features to the device.

Many of the attendant features will be more readily appreciated as they become better understood by reference to the following detailed description considered in connection with the accompanying drawings. The embodiments described below are not limited to implementations which solve any or all of the disadvantages of known imaging apparatuses integrated in hand-held devices.

DESCRIPTION OF THE DRAWINGS

The present description will be better understood from the following detailed description read in light of the accompanying drawings, wherein.

DETAILED DESCRIPTION

The detailed description provided below in connection with the appended drawings is intended as a description of the present embodiments and is not intended to represent the only forms in which the present embodiments may be constructed or utilized. However, the same or equivalent functions and sequences may be accomplished by different embodiments.

Although the present embodiments are described and illustrated herein as being implemented in a smartphone, the device described is provided as an example and not a limitation. As those skilled in the art will appreciate, the present embodiments are suitable for application in a variety of different types of mobile and/or hand-held apparatuses, e.g. in tablets, laptops, digital cameras or gaming consoles.

Figure 1A:
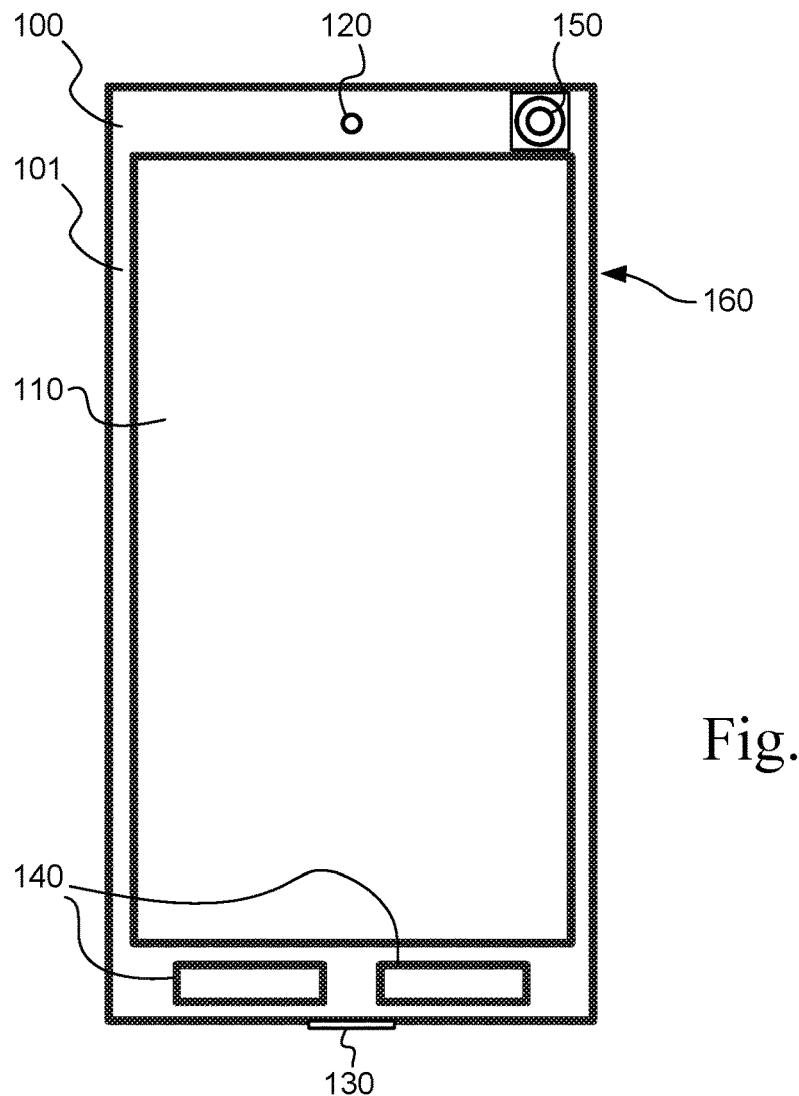
FIG. 1a shows one embodiment of an electronic device incorporating two imaging apparatuses.
Figure 1B:
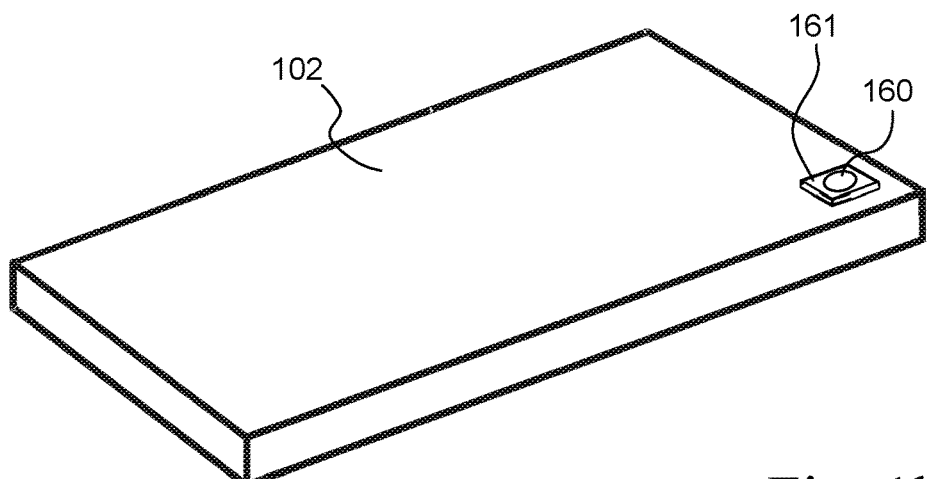
FIG. 1b shows the rear side of the embodiment with the imaging apparatus in an active position.

FIG. 1a shows a front side of one example of an electronic device incorporating an imaging apparatus, wherein one embodiment of the electronic device is a smartphone. The electronic device comprises a body 100 comprising a display 110, a speaker 120, a microphone 130 and keys 140. The electronic device comprises an imaging apparatus 150, a camera on one surface. The electronic device may comprise two or more cameras, for example a front camera 150 on the front surface and another imaging apparatus, a rear camera 160 on the rear side. FIG. 1b shows the rear side of the electronic device, wherein the rear camera 160 resides on a retractable element 161. In one example the retractable element provides a protective casing for at least one lens actuator and a first lens group. The retractable element 161 is shown in an active position, wherein at least one lens and at least one actuator are moved apart from the image sensor group along an optical axis. The optical axis is a line along which there is some degree of rotational symmetry in an optical system. The optical axis is an imaginary line that defines a path along which light propagates through the system. In an inactive position the retractable element 161 may be flush with the rear surface. According to an embodiment, a transparent front surface 101 made of glass covers the display and the lens of the front camera 150. The rear surface 102 is opaque and is, for example, made of plastic or metal. Having a retractable element protruding from a glass surface may require additional edges and sharp corners to be manufactured to the glass surface, therefore implementing the retractable element on a surface made of plastic or metal may be more economical.

Figure 2A:
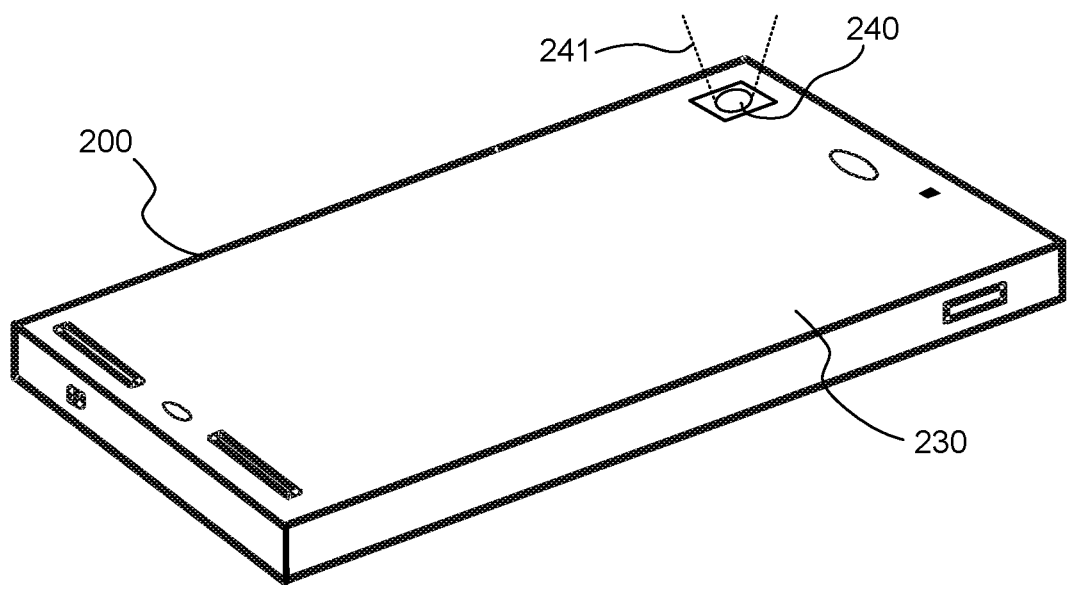
FIG. 2a shows one embodiment of an electronic device incorporating one imaging apparatus.
Figure 2B:
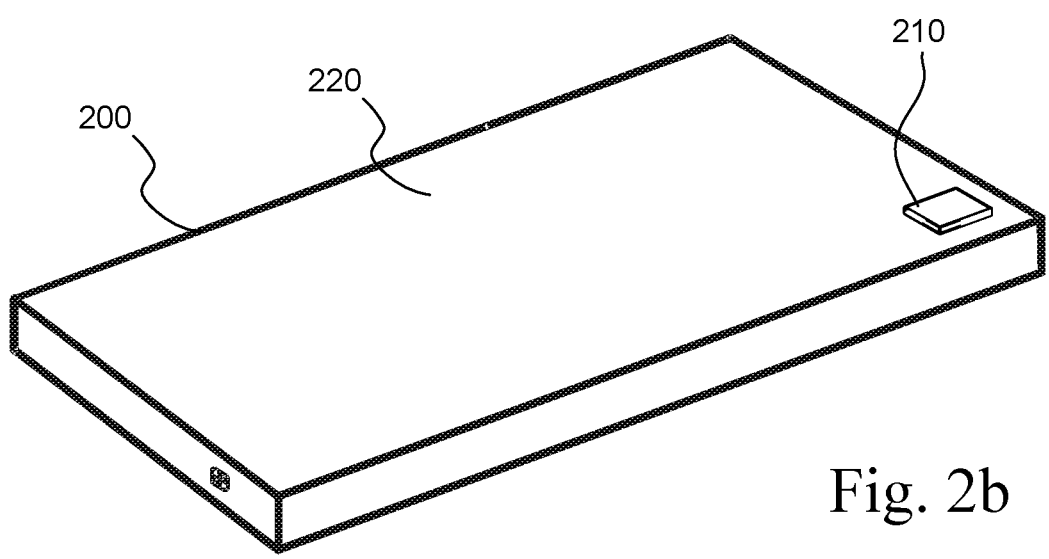
FIG. 2b shows the rear side of the embodiment with the imaging apparatus in an active position.

FIGS. 2a and 2b illustrate a device 200 having a movable sensor group inside the retractable element 210, according to an embodiment. The retractable element 210 protrudes from the rear surface 220. The front surface 230 is covered with transparent material such as glass. An imaging device 240, for example a camera, has an optical field of vision 241 through the flush front surface 230. The retractable element 210 protrudes from the rear surface 220 in the active position, providing additional distance between the sensor group and the first lens group. In an embodiment a portion of the transparent front surface 230 is comprised in the first lens group. As illustrated in the previous examples, the travel of the retractable element may be few millimeters to allow the active position.

Figure 3A:
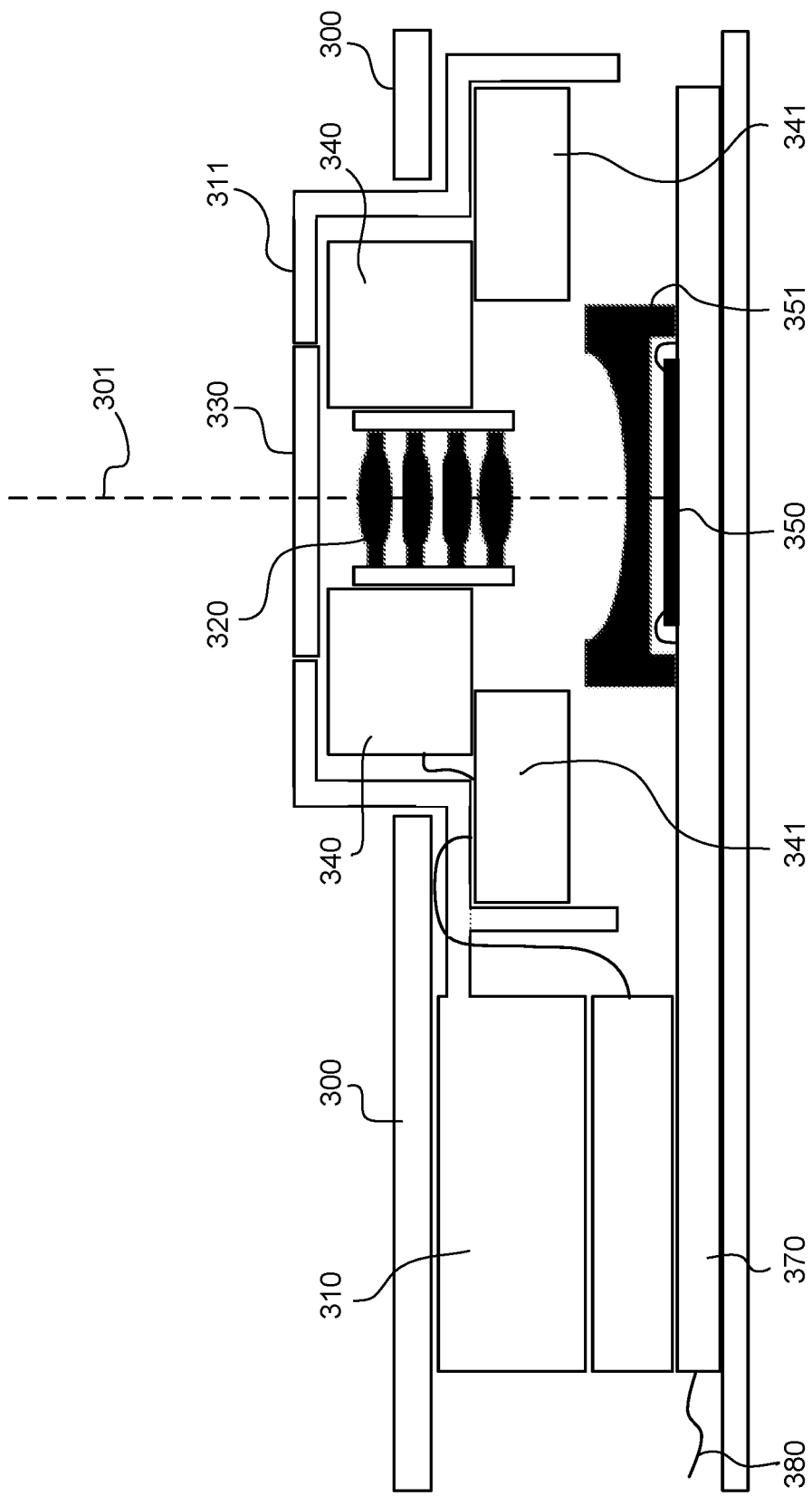
FIG. 3a is a simplified cross-sectional view of one embodiment of an imaging apparatus in an active position.

FIG. 3a is a simplified cross-sectional view of the imaging apparatus implemented in the electronic device in the active position. A first lens group 320 is positioned on the optical axis 301, wherein the first lens group 320 comprises the lens through which the light travels to the image sensor group 350. The first lens group 320 may comprise only one lens or it may be a combination of several lenses. In an embodiment, a window 330 on the retractable element 311 is a lens forming a part of the first lens group 320. The window 330 is not moved by a lens group actuator. In an embodiment, the first lens group 320 is a lens barrel, wherein the lenses may be fixed in relation to each other or they may be moved in order to enable various optical characteristics. An autofocus actuator 340 is configured to move the first lens group 320 or at least one lens in the first lens group 320 in order to reach a sharp focus on the image plane and on the image sensor 350. In an embodiment, the autofocus actuator is configured to alter the optical zoom factor. In an embodiment, the optical zoom factor is altered by an actuator configured inside the lens barrel. The autofocus actuator 340 is an example of a lens group actuator. The extended position allows movement for the lens group actuators 340, 341.

An optical image stabilizer 341 is configured to move the first lens group 320—in an embodiment, the optical image stabilizer 341 is configured to move the autofocus actuator 340 together with the first lens group 320. The optical image stabilizer 341 is an example of a lens group actuator. In an embodiment, the optical image stabilizer 341 is attached to the first lens group or to the lens barrel; whereas the autofocus actuator 340 is configured to move the image stabilizer 341 and the first lens group 320. In an embodiment, the autofocus actuator 340 is electromechanically connected to the optical image stabilizer 341, under the autofocus actuator 340 on the component stack.

According to an embodiment, the retractable element 311 suspends the structure of the at least one lens group actuator 340, 341 and at least portion of the first lens group 320. The retractable element 311 may comprise a frame that enables attaching the first lens group 320 or the at least one lens group actuator 340, 341 to the retractable element 311. In an embodiment, the retractable element 311 is configured to move, for example, on a rail or similar structure that guides the movement.

A second actuator 310 is configured to move the first lens group 320 along the optical axis 301 between the active and inactive positions. The second actuator 310 is configured to adjust the distance between at least one lens group actuator 340, 341 and the image sensor group 350. The first lens group 320 and the at least one lens group actuator 340, 341 have the active position and the inactive position in relation to the image sensor group 350 along the optical axis 301. In the active position the first lens group 320 and the at least one lens group actuator 340, 341 protrude from the device body 300 along the optical axis 301. In an embodiment, the actuator is a lifting mechanism that may comprise mechanical elements such as a lever that the user of the device applies in order to alter the distance between the first lens group 320 and the image sensor group 350 between active and inactive positions. In an embodiment, the lifting mechanism is a transmission system.

The image sensor group 350 resides on the optical axis, the image sensor 350 being on an image plane. The image sensor 350 is arranged on the optical axis to receive the image from the first lens group 320. A focal plane is a plane where object appears in focus. In an embodiment, the first lens group 320 is tilted in the direction that reduces the effect of detected shaking to achieve optical image stabilization. The tilted first lens group 320 causes the focal plane to tilt as well, wherein the focal plane and the image sensor 350 are not aligned. The image sensor 350 comprises, for example, a plurality of light sensing elements that measure the light captured by the light sensing elements to form an image of pixels. In an embodiment, the image sensor group 350 comprises the field flattening lens 351. The field flattening lens 351 corrects the focal plane projection error caused by tilting the first lens group 320. In an embodiment the image is stabilized by tilting and shifting the lens. In an embodiment the image is stabilized by shifting the lens. In an embodiment the image is stabilized by moving the image sensor or the image sensor group 350. The image sensor group may be defined by comprising an image sensor, an image sensor with one static lens or an image sensor with more than one static lenses.

The image sensor group 350 is mounted on the circuit board 370. The camera hardware 370 may comprise at least one of: a processor, a controller, a memory, or a sensor such as a gyroscope. A wiring, such a flex cable 380 may connect the imaging apparatus to the electronic device.

Figure 3B:
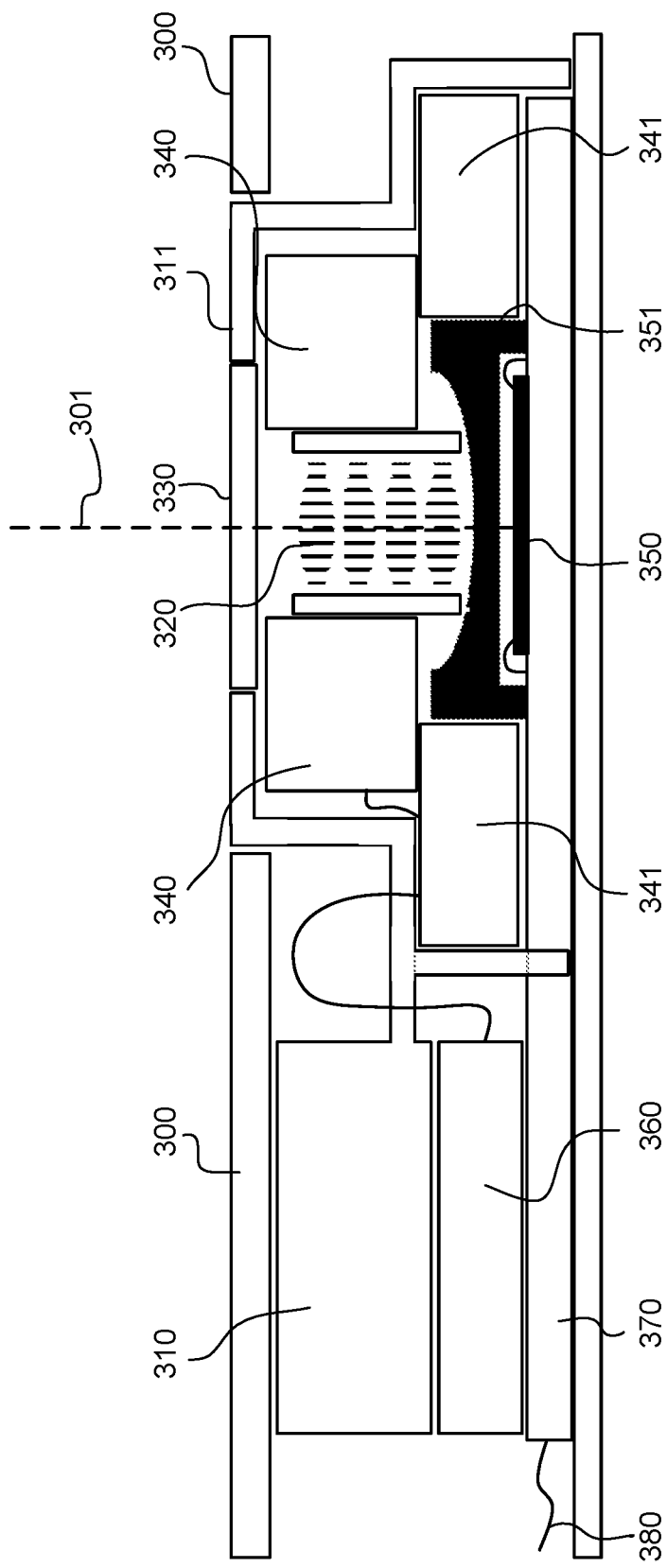
FIG. 3b is a simplified cross-sectional view of the embodiment in an inactive position.

FIG. 3b shows the imaging apparatus in the inactive position. In the inactive position a portion of the one lens group actuator 341 is at the same level with the image sensor group 350, perpendicular to the optical axis 301. According to an embodiment, the first lens group 320 and the at least one lens group actuator 340, 341 are inside the device body 300. The lens is retracted, as the first lens group 320 is brought near the image sensor group 350. The lens group actuator lowered to the level of image sensor group 350 may be the autofocus actuator 340 or the optical image stabilizer 341, wherein the two lens group actuators may be stacked. In an embodiment, the lower lens group actuator is an autofocus actuator 340 or an optical image stabilizer 341.

The previous embodiment showed two-group optics, where the components are in the inactive position at a distance shorter than typical functional clearances. Examples of functional clearances are autofocus stroke, tolerance margins or the back focal length. The image sensor group remains static, whereas the first lens group is able to move vertically, along the optical axis. In an embodiment, the image sensor group and at least one lens group actuator are nested in the inactive position.

Figure 4A:
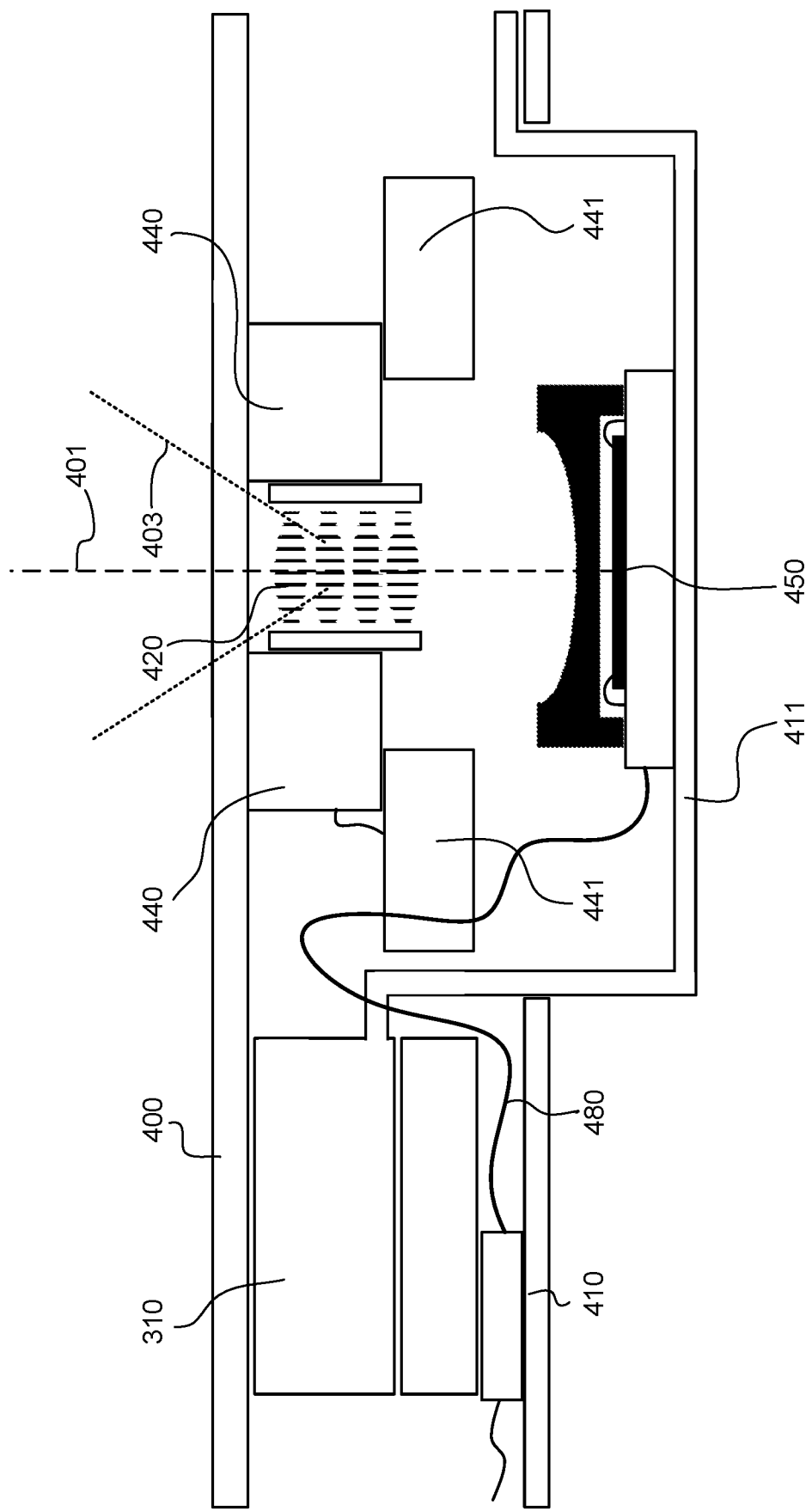
FIG. 4a is a simplified cross-sectional view of one embodiment of an imaging apparatus in an active position having a movable image sensor.
Figure 4B:
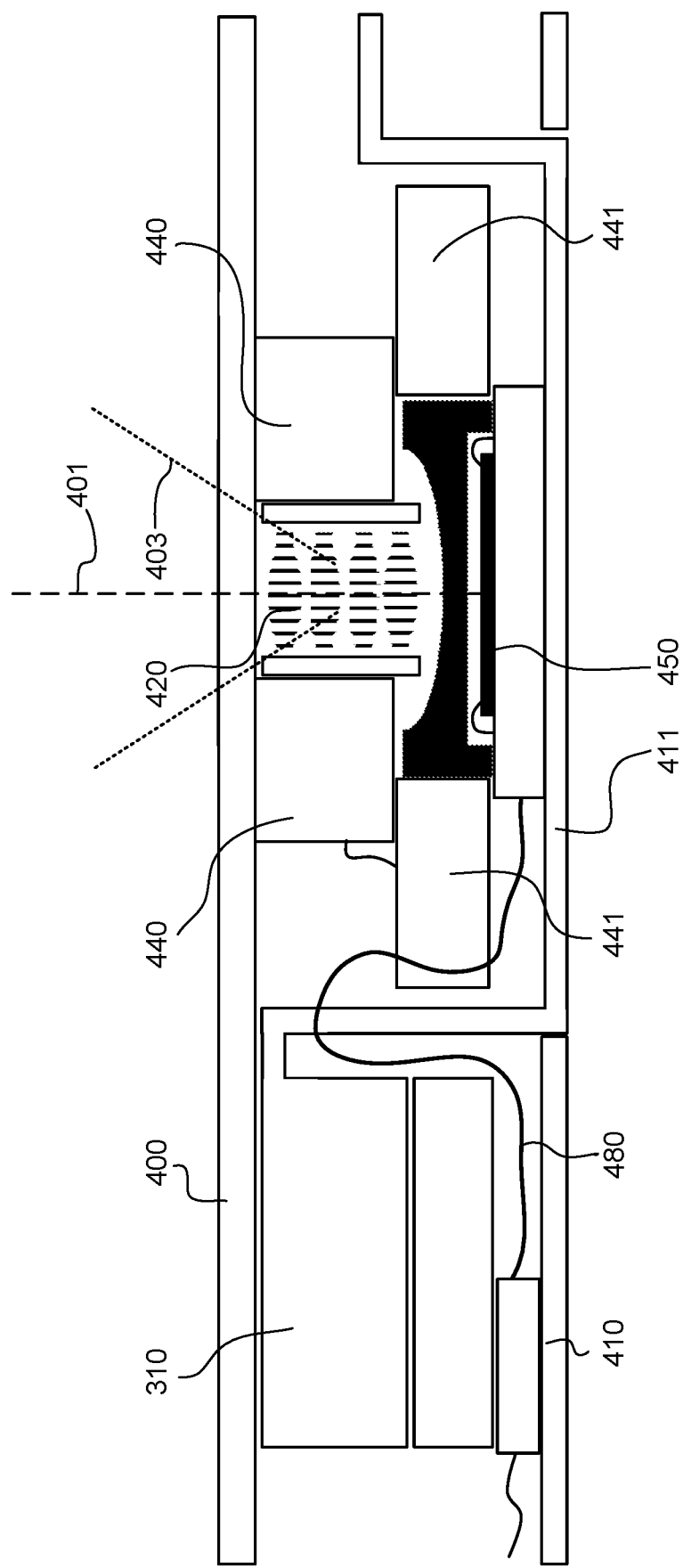
FIG. 4b is a simplified cross-sectional view of the embodiment in an inactive position.

FIGS. 4a and 4b illustrate an embodiment, where the image sensor group 450 is movable in relation to the first lens group 420 and the device body. The device body comprises a transparent front surface 400 and an opaque rear surface 410. The first lens group 420 is attached inside the device body facing the transparent front surface 400. The first lens group may be attached to the device body by suspending from at least one lens group actuator 440, 441. The optical field of vision 403 of the imaging apparatus passes through the transparent surface 400. FIG. 4a shows the active position, wherein the image sensor group 450 protrudes from the device body along the optical axis 401. A retractable element 411 covers the imaging apparatus structure. The retractable element 411 protrudes from the device body causing a distance between the first lens group 420 and the image sensor group 450. The image sensor group 450 is attached to the retractable element 411. A wiring, such a flex cable 480 connects the image sensor group to the imaging apparatus.

In the inactive position the image sensor group 450 is inside the device body, as illustrated in FIG. 4b. In this example the device body is flush without any protrusions from the imaging apparatus. In an embodiment, the design may allow different shapes to be used in the context of retractable element.

The lens group actuator may be a voice coil actuator, a piezo actuator or a shape memory alloy actuator. In an embodiment, the actuator has a circular shape and the image sensor group fits inside the actuator perimeter. The lens group actuator may surround the image sensor group.

Figure 5:
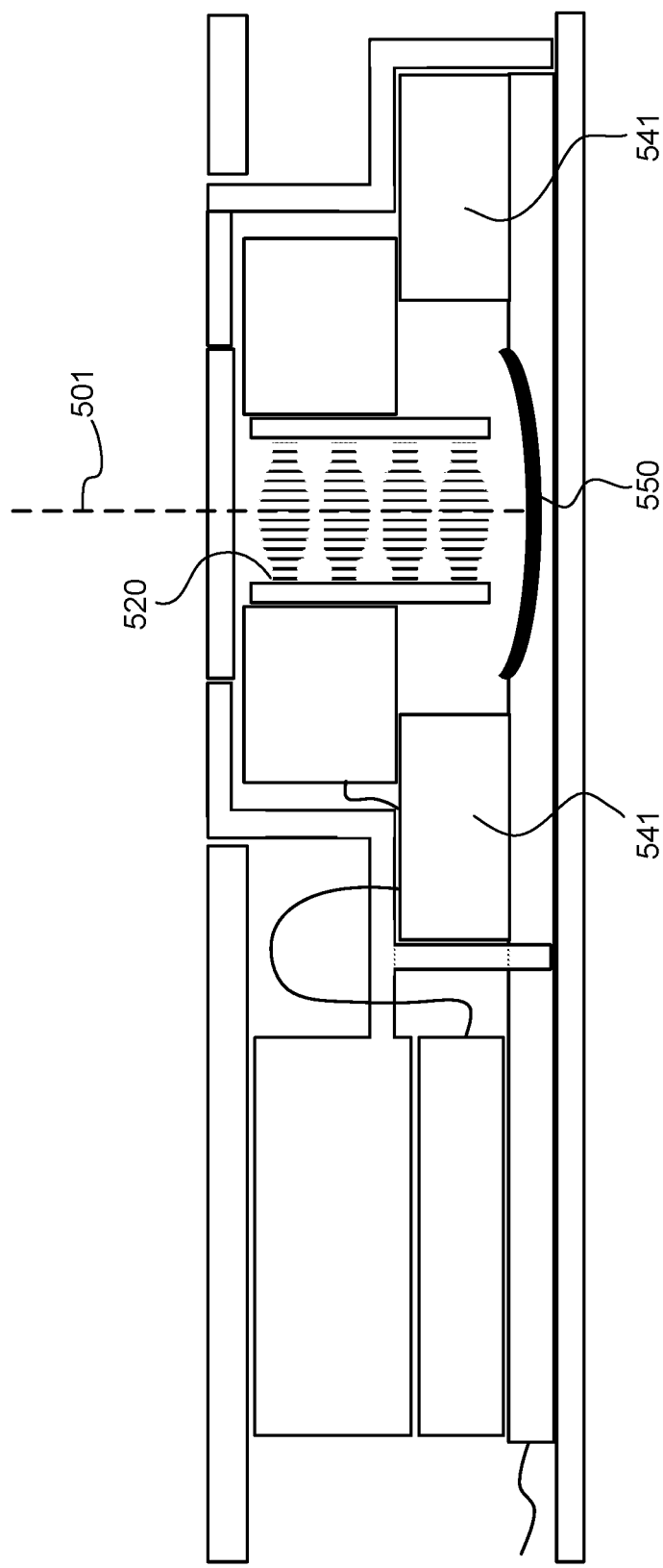
FIG. 5 is a simplified cross-sectional view of one embodiment of an imaging apparatus having a curved image sensor. Like reference numerals are used to designate like parts in the accompanying drawings.

In an embodiment, the image sensor group comprises a curved image sensor 550, as illustrated in FIG. 5. The curved sensor 550 functions with the tiltable lens barrel 520 as the curvature of the sensor 550 follows the focal plane projection. In an embodiment, correcting the focal plane projection error with the field flattener lens is not required. The space required by the inactive position may be further reduced. The lens group actuator 541 may be lowered to the same plane as the curved sensor 550. The level is defined as being perpendicular to the optical axis 501. In an embodiment, a functional portion of the lens group actuator 541 is at the same level as the image sensor 550 or the image sensor group.

The retractable lens structure utilizes the available space around the image sensor group. For a flat device the height of the imaging device must be minimized. In this context the improvement in the scale of 0.01 mm difference of the imaging device's size may be considered an improvement. The reduced size of a single component may have an effect to other components in the electronic device, for example, in how other components are positioned inside the device.

An imaging apparatus is disclosed, comprising: a first lens group on an optical axis; at least one lens group actuator configured to move the first lens group; an image sensor group on the optical axis; and a second actuator configured to adjust the distance between the at least one lens group actuator and the image sensor group, the first lens group and the at least one lens group actuator having an active position and an inactive position in relation to the image sensor group along the optical axis. In the inactive position a portion of the one lens group actuator is at the same level with the image sensor group, perpendicular to the optical axis. In an embodiment, the at least one lens group actuator is an autofocus actuator or an optical image stabilizer. In an embodiment, the first lens group actuator is an autofocus actuator and the second lens group actuator is an optical image stabilizer. In an embodiment, in the inactive position a portion of the autofocus actuator is at the same level with the image sensor group. In an embodiment, in the inactive position a portion of the autofocus actuator and a portion of the optical image stabilizer are at the same level with the image sensor group. In an embodiment, the imaging apparatus comprises a device body, wherein the image sensor group is attached inside the device body; the first lens group and the at least one lens group actuator are movable along the optical axis in relation to the image sensor group and the device body, wherein in the active position the first lens group and the at least one lens group actuator protrude from the device body along the optical axis; and in the inactive position the first lens group and the at least one lens group actuator are inside the device body. In an embodiment, the imaging apparatus comprises a device body having a transparent surface, the first lens group being attached inside the device body facing the transparent surface and an optical field of vision passing through the transparent surface; and the image sensor group is movable in relation to the first lens and the device body, wherein: in the active position the image sensor group protrudes from the device body along the optical axis; and in the inactive position the image sensor group is inside the device body. In an embodiment, the at least one lens group actuator is a voice coil actuator, a piezo actuator or a shape memory alloy actuator. In an embodiment, the image sensor group comprises a field flattener lens. In an embodiment, image sensor group comprises a curved image sensor.

A device is disclosed, comprising: a device body having a retractable element; a first lens group on an optical axis and at least one lens group actuator configured to move the first lens group; an image sensor group comprising an image sensor on the optical axis; the retractable element having an active position and an inactive position. In the active position the retractable element protrudes from the device body causing a distance between the first lens group and the image sensor group; in the inactive position a portion of the at least one lens group actuator is at the same level, perpendicular to the optical axis, with the image sensor group; and comprising a lifting mechanism configured to move the retractable element between the active position and the inactive position. In an embodiment, the at least one lens group actuator is an autofocus actuator or an optical image stabilizer. In an embodiment, the device comprises two lens group actuators, wherein the first lens group actuator is an autofocus actuator and the second lens group actuator is an optical image stabilizer. In an embodiment, the device body comprises a transparent surface, the first lens group is attached inside the device body facing the transparent surface and an optical field of vision passing through the transparent surface; and the image sensor group is attached to the retractable element, wherein the image sensor group is movable in relation to the first lens group and the device body, wherein: in the active position the image sensor group protrudes from the device body along the optical axis; and in the inactive position the image sensor group is inside the device body. In an embodiment, the image sensor group is attached inside the device body; the first lens group and the at least one lens group actuator are connected to the retractable element and the first lens group and the at least one lens group actuator are movable along the optical axis in relation to the image sensor group and the device body.

A system is disclosed, comprising: a first lens group on an optical axis; an image sensor group on the optical axis; and at least one lens group actuator configured to move the first lens group; a second actuator configured to adjust the distance between the at least one lens group actuator and the image sensor group along the optical axis, the first lens group and the at least one lens group actuator having an active position and an inactive position in relation to the image sensor group along the optical axis, wherein: in the inactive position a portion of the one lens group actuator is at the same level with the image sensor group, perpendicular to the optical axis. In an embodiment, the at least one lens group actuator is an autofocus actuator or an optical image stabilizer. In an embodiment, the system comprises two lens group actuators, wherein the first lens group actuator is an autofocus actuator and the second lens group actuator is an optical image stabilizer, wherein in the inactive position a portion of the autofocus actuator and a portion of the optical image stabilizer are at the same level with the image sensor group. In an embodiment, the system comprises a device body, wherein the image sensor group is attached inside the device body; the first lens group and the at least one lens group actuator are movable along the optical axis in relation to the image sensor group and the device body, wherein: in the active position the first lens group and the at least one lens group actuator protrude from the device body along the optical axis; and in the inactive position the first lens group and the at least one lens group actuator are inside the device body. In an embodiment, the system comprises a device body having a transparent surface, the first lens group being attached inside the device body facing the transparent surface and an optical field of vision passing through the transparent surface; and the image sensor group being movable in relation to the first lens and the device body, wherein: in the active position the image sensor group protrudes from the device body along the optical axis; and in the inactive position the image sensor group is inside the device body.

An example of the apparatus or a system described hereinbefore is a computing-based device comprising one or more processors which may be microprocessors, controllers or any other suitable type of processors for processing computer executable instructions to control the operation of the device in order to control one or more sensors, receive sensor data and use the sensor data. Platform software comprising an operating system or any other suitable platform software may be provided at the computing-based device to enable application software to be executed on the device.

The computer executable instructions may be provided using any computer-readable media that is accessible by computing based device. Computer-readable media may include, for example, computer storage media such as memory and communications media. Computer storage media, such as memory, includes volatile and non-volatile, removable and non-removable media implemented in any method or technology for storage of information such as computer readable instructions, data structures, program modules or other data. Computer storage media includes, but is not limited to, RAM, ROM, EPROM, EEPROM, flash memory or other memory technology, CD-ROM, digital versatile disks (DVD) or other optical storage, magnetic cassettes, magnetic tape, magnetic disk storage or other magnetic storage devices, or any other non-transmission medium that can be used to store information for access by a computing device. In contrast, communication media may embody computer readable instructions, data structures, program modules, or other data in a modulated data signal, such as a carrier wave, or other transport mechanism. As defined herein, computer storage media does not include communication media. Therefore, a computer storage medium should not be interpreted to be a propagating signal per se. Propagated signals may be present in a computer storage media, but propagated signals per se are not examples of computer storage media. Although the computer storage media is shown within the computing-based device it will be appreciated that the storage may be distributed or located remotely and accessed via a network or other communication link, for example by using communication interface.

The computing-based device may comprise an input/output controller arranged to output display information to a display device which may be separate from or integral to the computing-based device. The display information may provide a graphical user interface, for example, to display hand gestures tracked by the device using the sensor input or for other display purposes. The input/output controller is also arranged to receive and process input from one or more devices, such as a user input device (e.g. a mouse, keyboard, camera, microphone or other sensor). In some embodiments the user input device may detect voice input, user gestures or other user actions and may provide a natural user interface (NUI). This user input may be used to configure the device for a particular user such as by receiving information about bone lengths of the user. In an embodiment the display device may also act as the user input device if it is a touch sensitive display device. The input/output controller may also output data to devices other than the display device, e.g. a locally connected printing device.

The term 'computer' or 'computing-based device' is used herein to refer to any device with processing capability such that it can execute instructions. Those skilled in the art will realize that such processing capabilities are incorporated into many different devices and therefore the terms 'computer' and 'computing-based device' each include PCs, servers, mobile telephones (including smart phones), tablet computers, set-top boxes, media players, games consoles, personal digital assistants and many other devices.

Any range or device value given herein may be extended or altered without losing the effect sought.

Although the subject matter has been described in language specific to structural features and/or acts, it is to be understood that the subject matter defined in the appended claims is not necessarily limited to the specific features or acts described above. Rather, the specific features and acts described above are disclosed as examples of implementing the claims and other equivalent features and acts are intended to be within the scope of the claims.

It will be understood that the benefits and advantages described above may relate to one embodiment or may relate to several embodiments or a combination thereof. The embodiments are not limited to those that solve any or all of the stated problems or those that have any or all of the stated benefits and advantages. It will further be understood that reference to 'an' item refers to one or more of those items.

The term 'comprising' is used herein to mean including the method blocks or elements identified, but that such blocks or elements do not comprise an exclusive list and a method or apparatus may contain additional blocks or elements.

It will be understood that the above description is given by way of example only and that various modifications may be made by those skilled in the art. The above specification, examples and data provide a complete description of the structure and use of exemplary embodiments. Although various embodiments have been described above with a certain degree of particularity, or with reference to one or more individual embodiments, those skilled in the art could make numerous alterations to or combinations of the disclosed embodiments without departing from the spirit or scope of this specification.

The invention claimed is:

1. An imaging apparatus, comprising:
   a device body;
   a first lens group on an optical axis;
   a group of actuators configured to move the first lens group, the group of actuators comprising a first actuator and a second actuator, the first lens group being substantially surrounded by each of the first actuator and the second actuator, the first actuator is configured to move the second actuator and the first lens group or the second actuator is configured to move the first actuator and the first lens group;
   an image sensor group on the optical axis; and a third actuator configured to adjust the distance between the group of actuators and the image sensor group, wherein the third actuator is static relative to the optical axis, the first lens group and the group of actuators having an active position and an inactive position in relation to the image sensor group along the optical axis, wherein in the inactive position the image sensor group and the group of actuators are nested.

2. The imaging apparatus according to claim 1, wherein the first actuator is an autofocus actuator and the second actuator is an optical image stabilizer.

3. The imaging apparatus according to claim 2, wherein in the inactive position a portion of the autofocus actuator is at the same level as the image sensor group.

4. The imaging apparatus according to claim 2, wherein in the inactive position a portion of the autofocus actuator and a portion of the optical image stabilizer are at the same level as the image sensor group.

5. The imaging apparatus according to claim 1, comprising a device body, wherein
the image sensor group is attached inside the device body;
the group actuators are movable along the optical axis in relation to the image sensor group and the device body.

6. An imaging apparatus according to claim 1, comprising a device body having a transparent surface,
the first lens group being attached inside the device body facing the transparent surface and an optical field of vision passing through the transparent surface; and
the image sensor group is movable in relation to the first lens and the device body, wherein:
in the active position the image sensor group protrudes from the device body along the optical axis; and
in the inactive position the image sensor group is inside the device body.

7. The imaging apparatus according to claim 1, wherein the second actuator is between the first actuator and the third actuator.

8. The imaging apparatus according to claim 7, in the active position, the first lens group and the first actuator protrude from the device body along the optical axis and the second actuator remains inside the device body.

9. The imaging apparatus according to claim 1, wherein the image sensor group comprises a curved image sensor.

10. The imaging apparatus according to claim 1, wherein the first actuator is circular in shape.

11. The imaging apparatus according to claim 1, wherein in the inactive position the image sensor group and the group of actuators are nested inside the device body.

12. The imaging apparatus according to claim 1, wherein an optical zoom factor is altered by an actuator configured inside the first lens group.

13. A device, comprising:
a device body having a retractable element;
a first lens group on an optical axis and a group of actuators configured to move the first lens group, the group of actuators comprising a first actuator and a second actuator, the first lens group being surrounded by each of the first actuator and the second actuator, the first actuator is configured to move the second actuator and the first lens group or the second actuator is configured to move the first actuator and the first lens group;
an image sensor group comprising an image sensor on the optical axis;
the retractable element having an active position and an inactive position, wherein in the inactive position the image sensor group and the group of actuators are nested; and
a lifting mechanism configured to alter the distance between the first lens group and the image sensor group, wherein the lifting mechanism is static relative to the optical axis, the lifting mechanism configured to move the retractable element between the active position and the inactive position.

14. The device according to claim 13, wherein in the active position, the first lens group and the first actuator protrudes from the device body causing a distance between the first lens group and the image sensor group.

15. The device according to claim 13, wherein the device body comprises a transparent surface,
the first lens group is attached inside the device body facing the transparent surface and an optical field of vision passing through the transparent surface; and
the image sensor group is attached to the retractable element, wherein the image sensor group is movable in relation to the first lens group and the device body, wherein:
in the active position the image sensor group protrudes from the device body along the optical axis; and
in the inactive position the image sensor group is inside the device body.

16. The device according to claim 13, wherein
the image sensor group is attached inside the device body;
the first lens group and the group of actuators are connected to the retractable element and the first lens group and the group of actuators are movable along the optical axis in relation to the image sensor group and the device body.

17. A system comprising:
a device body;
a first lens group on an optical axis;
an image sensor group on the optical axis; and
a group of actuators configured to move the first lens group, the group of actuators comprising a first actuator and a second actuator, the first lens group being surrounded by the first actuator and the second actuator, the first actuator is configured to move the second actuator and the first lens group or the second actuator is configured to move the first actuator and the first lens group;
a third actuator configured to adjust the distance between the group of actuators and the image sensor group along the optical axis, wherein the third actuator is static relative to the optical axis, and wherein the second actuator is between the first actuator and the third actuator,
the first lens group and the group of actuators having an active position and an inactive position in relation to the image sensor group along the optical axis, wherein:
in the inactive position the image sensor group and the group of actuators are within the device body; and
in the active position, the first lens group and the first actuator protrude from the device body along the optical axis and the second actuator remains inside the device body.

18. The system according to claim 17, wherein the actuator is an autofocus actuator and the second actuator is an optical image stabilizer, wherein in the inactive position a portion of the autofocus actuator and a portion of the optical image stabilizer are at the same level with the image sensor group.

19. The system according to claim 17, wherein:
the image sensor group is attached inside the device body; and
the first lens group and the group of actuators are movable along the optical axis in relation to the image sensor group and the device body.

20. The system according to claim 17, comprising a device body having a transparent surface,
the first lens group being attached inside the device body facing the transparent surface and an optical field of vision passing through the transparent surface; and
the image sensor group is movable in relation to the first lens and the device body, wherein:
in the active position the image sensor group protrudes from the device body along the optical axis; and
in the inactive position the image sensor group is inside the device body.

\* \* \* \* \*